United States Patent
Jameson

(10) Patent No.: US 9,360,058 B2
(45) Date of Patent: Jun. 7, 2016

(54) DRIVE ASSEMBLY INCLUDING DRIVE TAB FIXED TO TURBINE SHELL AND METHOD OF FORMING

(71) Applicant: Schaeffler Technologies GmbH & Co. KG, Herzogenaurach (DE)

(72) Inventor: Jonathan Jameson, Dalton, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/331,128

(22) Filed: Jul. 14, 2014

(65) Prior Publication Data

US 2015/0021135 A1 Jan. 22, 2015

Related U.S. Application Data

(60) Provisional application No. 61/846,901, filed on Jul. 16, 2013.

(51) Int. Cl.
*F16D 33/18* (2006.01)
*F16H 45/02* (2006.01)

(52) U.S. Cl.
CPC ............... *F16D 33/18* (2013.01); *F16H 45/02* (2013.01); *F16D 2250/0069* (2013.01); *F16H 2045/0205* (2013.01); *F16H 2045/0226* (2013.01); *F16H 2045/0278* (2013.01); *Y10T 29/49234* (2015.01)

(58) Field of Classification Search
CPC ................................................ F16D 2250/0069
See application file for complete search history.

(56) References Cited

U.S. PATENT DOCUMENTS

| | | | | |
|---|---|---|---|---|
| 5,813,505 | A * | 9/1998 | Olsen | F16H 45/02 192/200 |
| 6,056,093 | A * | 5/2000 | Hinkel | 192/3.29 |
| 6,290,042 | B1 * | 9/2001 | Breier | 192/3.29 |
| 8,257,042 | B2 | 9/2012 | Noro et al. | |
| 2002/0027053 | A1 * | 3/2002 | Back et al. | 192/3.3 |
| 2006/0086584 | A1 * | 4/2006 | Maucher et al. | 192/3.29 |
| 2008/0277222 | A1 * | 11/2008 | Olsen et al. | 192/3.21 |
| 2011/0247322 | A1 * | 10/2011 | Lindemann et al. | 60/338 |
| 2012/0247900 | A1 * | 10/2012 | Graf | 192/3.25 |
| 2013/0205944 | A1 * | 8/2013 | Sudau et al. | 74/573.1 |

* cited by examiner

*Primary Examiner* — Mark Manley
(74) *Attorney, Agent, or Firm* — Davidson, Davidson & Kappel, LLC

(57) ABSTRACT

A drive assembly for a torque converter is provided. The drive assembly includes a turbine shell including a rounded portion and an outer radial extension on an outer circumference of rounded portion; and a tab plate bonded to the outer radial extension of the turbine shell by adhesive. A method of forming a drive assembly for a torque converter is also provided.

20 Claims, 1 Drawing Sheet

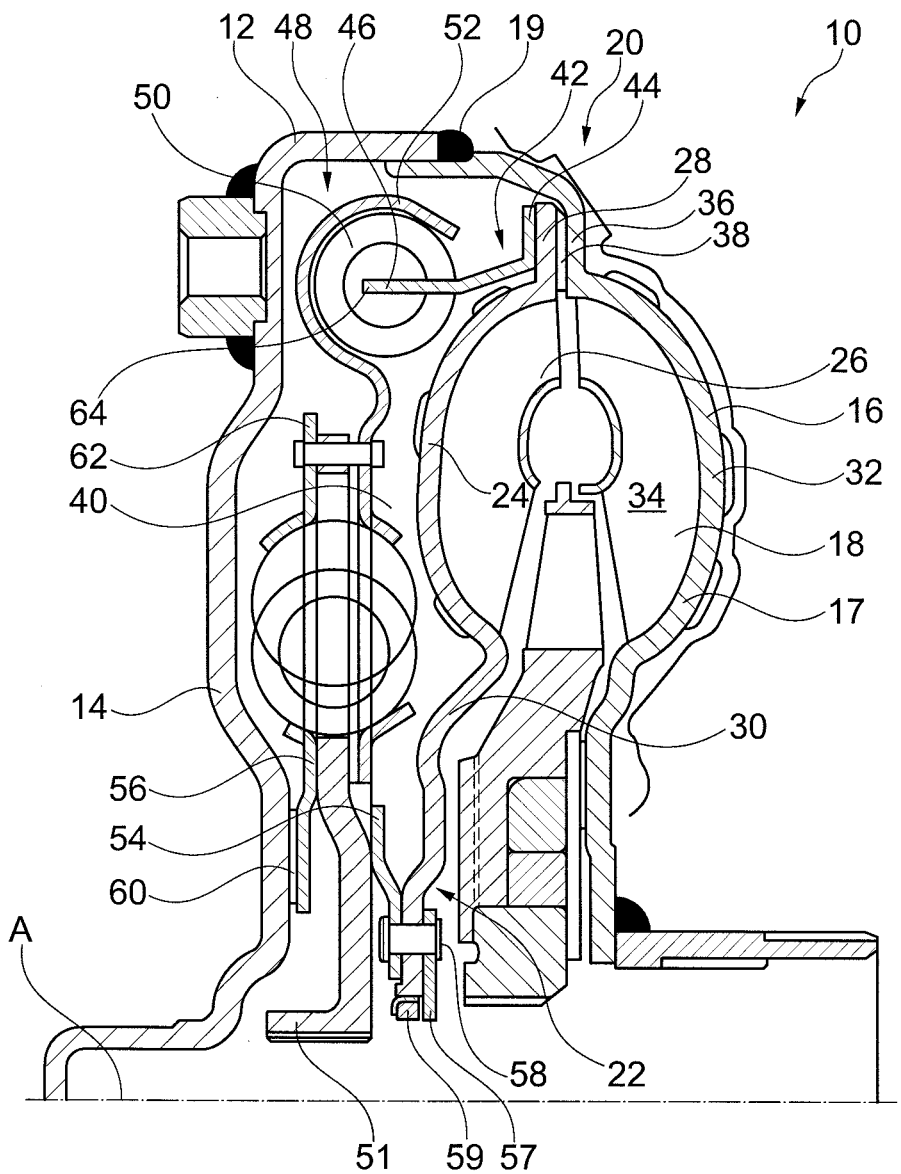

DRIVE ASSEMBLY INCLUDING DRIVE TAB FIXED TO TURBINE SHELL AND METHOD OF FORMING

This claims the benefit to U.S. Provisional Patent Application No. 61/846,901, filed on Jul. 16, 2013, which is hereby incorporated by reference herein.

The present disclosure relates to drive assemblies of torque converters, and more particularly to drive tabs fixed to turbine shells of torque converters.

BACKGROUND

U.S. Pat. No. 8,257,042 discloses a welded drive plate or power transmitting member.

SUMMARY OF THE INVENTION

A drive assembly for a torque converter is provided. The drive assembly includes a turbine shell including a rounded portion and an outer radial extension on an outer circumference of rounded portion; and a tab plate bonded to the outer radial extension of the turbine shell by adhesive.

Embodiments of the torque converter may also include one or more of the following advantageous features:

The torque converter may further include an impeller, the outer radial extension of the turbine shell configured to engage and disengage the impeller. The torque converter may further include a friction surface on a side of the outer radial extension opposite the tab plate, the outer radial extension engaging and disengaging the impeller via the friction surface. The friction surface may be bonded to the outer radial extension by adhesive. The tab plate and the friction surface may be bonded to the outer radial extension by the same adhesive. The turbine shell may be axially slidable for the outer radial extension to engage and disengage the impeller. The torque converter may further include a damper driven by the drive tab. The turbine shell may include an inner radial extension on an inner circumference of rounded portion, the damper being fixed to the inner radial extension. The damper may include a spring retainer holding a plurality of springs, the drive tab drivingly engaging the plurality of springs. The damper may include a cover plate having a thrust surface for sliding along a cover of the torque converter.

A method of forming a drive assembly for a torque converter is also provided. The method includes bonding a drive tab to a turbine shell by adhesive.

Embodiments of the method may also include one or more of the following advantageous features:

The method may further include stamping the drive tab from an outer diameter of a cover plate of a damper. The method may further include applying a hardening heat treatment the drive tab and the cover plate together before bonding the drive tab to the turbine shell. The method may further include drivingly engaging the damper with the drive tab. The method may further include providing a thrust surface on the cover plate for sliding along a cover of the torque converter. The turbine shell may include a rounded portion and an outer radial extension on an outer circumference of the rounded portion, the drive tab being bonded to the outer radial extension. The method may further include bonding a friction material to a side of the outer radial extension opposite the drive tab by adhesive. The tab plate and the friction material may be bonded to the outer radial extension by the same adhesive. The method may further include engaging an impeller with the radial extension. The method may further include fixing a damper to an inner radial extension of the turbine shell.

BRIEF DESCRIPTION OF THE DRAWINGS

The present invention is described below by reference to the following drawing, in which:

FIG. 1 shows a torque converter including a drive assembly according to an embodiment of the present invention.

DETAILED DESCRIPTION

FIG. 1 shows a torque converter 10 according to an embodiment of the present invention. Torque converter 10 includes a cover 12 having a front portion 14 for connecting to a crankshaft of an internal combustion engine and a rear portion 16 forming a shell 17 of an impeller or pump 18. Front portion 14 and rear portion 16 are both substantially cup shaped and are joined by providing an axial extension of rear portion 16 radially inside of an axial extension of front portion 14. The axial extension of front portion 14 may then be welded to an outer surface of the axial extension of rear portion 16 to form a weld 19.

A turbine 20 is housed inside of cover 12 and includes a turbine shell 22 having a rounded portion 24 supporting a plurality of turbine blades 26 on a surface of turbine shell 22 facing impeller 18. Turbine 20 includes an outer radial extension 28 radially protruding outwardly from an outer circumference of rounded portion 24 and an inner radial extension 30 radially protruding inwardly from an inner circumference of rounded portion 24. Impeller shell 17 includes a rounded portion 32 supporting a plurality of impeller blades 34 and an outer radial portion 36 radially extending outwardly from an outer circumference of rounded portion 32.

Turbine 20 is configured to be axially slidable toward and away from impeller 18 to engage and disengage impeller 18. A friction material 38 is bonded onto a surface of outer radial extension 28 of turbine shell 22 facing impeller 18 to form a friction surface on outer radial extension 28 for engaging the outer radial portion 36 of rear portion 16. A force generated by fluid pressure in a fluid pressure region 40 may force turbine shell 22 toward impeller 18 so that friction material 38 engages outer radial portion 36 and turbine 20 rotates with impeller 18 and cover 12 at the same rotational velocity about axis A.

On a surface of outer radial extension 28 opposite of frictional material 38, a drive tab 42 is bonded to outer radial extension 28. In a preferred embodiment, both friction material 38 and drive tab 42 are bonded to outer radial extension 28 by the same adhesive, which may be for example a thermosetting phenolic adhesive such as Arofene 295-E-50 or MACtac IF-4023A. Drive tab 42 includes a radial portion 44 for bonding flat against outer radial extension 28 and an axial extension 46 for driving a damper 48. In particular, drive tab 42 drives a plurality of outer radial arc springs 50 of damper 48, which are held by a spring retainer 52. Axial extension 46 includes circumferentially extending spaces formed therein for circumferentially receiving arc springs 50. Spring retainer 52 includes a rounded portion extending around an outer circumference of arc springs 50 and an radially extending portion extending from the rounded portion toward axis A to form a first cover plate 54 for supporting inner radial arc springs 56 of damper 48 with a second cover plate 56. First cover plate 54 is fixed to inner radial extension 30 of turbine shell 22 and a retaining flange 57 by rivets 58. Inner radial extension 30 may slide along an outer surface of a stop 59, which retaining flange 57 contacts to limit the movement of inner radial extension 30 away from impeller 18. Damper 48 also includes a damper hub 51 between cover plates 54, 56 for transferring torque from damper 48 to a downstream drive component, for example a variable-speed transmission. As turbine 20 is driven by impeller 18, either through a lock-up connection created by contact between friction material 38 and impeller shell 17 or through fluid flow between blades 24, 34, turbine 20 transfers torque to damper 48 via drive tab 42, which damper 48 then transfers to the downstream drive component via damper hub 51.

Second cover plate 56 includes a thrust surface 60 formed by anti-friction material provided on a surface of cover plate 56 adjacent to front portion 14 of cover 12. To limit or prevent wear of thrust surface 60, this portion of cover plate 56 is modified to have a low coefficient of friction, which provides for smooth interactions between thrust surface 60 and the inner surface of front portion 14 of cover 12. For example, thrust surface 60 may be formed by a Teflon coating, a layer of low friction material, a plastic washer or a bearing. Thrust surface 60 allows cover plate 56 to slide along front portion 14 of cover 12 as damper 48 is rotated about axis A by turbine 20.

In a preferred embodiment of the present invention, drive tab 42 and cover plate 56 are cut from the same sheet of steel. In particular, drive tab 42 may be cut from an outer radial end 62 of cover plate 56 to define an end 64 of axial portion 46 of drive tab 42, which may be then further processed to form spaces for circumferentially receiving arc springs 50. Drive tab 42 is then bent to define radial portion 44 and axial portion 46 and subject to a heat treatment with cover plate 56 to harden drive tab 42 and cover plate 56. After being hardened, drive tab 42 may be bonded to turbine shell 22 by adhesive. In contrast to designs where drive tabs or plates are first connected to a turbine shell by inserting tabs of drive tab or plate into slots in the turbine shell and then bonded to the turbine shell by brazing, the bonding of drive tab 42 to turbine shell 22 by adhesive occurs at a lower temperature than brazing. The lower temperature of the bonding by adhesive advantageously allows drive tab 42 to be pre-hardened before the bonding. That is, because the part must be heated to a high temperature during brazing, a pre-hardened part would be softened in the brazing furnace. By contrast, although a thermosetting adhesive may be used to bond the drive tab to the turbine shell, the adhesive bonding temperature is low enough that a hardness of a pre-hardened part is not affected by the bonding process.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A drive assembly for a torque converter comprising:
a turbine shell including a rounded portion for supporting a plurality of turbine blades and an outer radial extension on an outer circumference of the rounded portion extending radially with respect to a center axis of the torque converter away from the turbine blades; and
a drive tab including a rear-side radially extending axially facing surface bonded to a front-side radially extending axially facing surface of the outer radial extension of the turbine shell by adhesive radially outside of the turbine blades.

2. The drive assembly as recited in claim 1 further comprising an impeller and a friction material being axially between a front-side radially extending axially facing surface of the impeller and a rear-side radially extending axially facing surface of the outer radial extension of the turbine shell, the outer radial extension of the turbine shell configured to engage and disengage the front-side radially extending axially facing surface of the impeller via the friction material.

3. The drive assembly as recited in claim 2 wherein the friction material forms a friction surface on the rear-side radially extending axially facing surface of the outer radial extension opposite the drive tab, the outer radial extension engaging and disengaging the impeller via the friction surface.

4. The drive assembly as recited in claim 3 wherein the friction surface is bonded to the outer radial extension by adhesive.

5. The drive assembly as recited in claim 4 wherein the drive tab and the friction surface are bonded to the outer radial extension by the same adhesive.

6. The drive assembly as recited in claim 2 wherein the turbine shell is axially slidable for the outer radial extension to engage and disengage the impeller.

7. The drive assembly as recited in claim 1 further comprising a damper driven by the drive tab.

8. The drive assembly as recited in claim 7 wherein the turbine shell includes an inner radial extension on an inner circumference of the rounded portion, the damper being fixed to the inner radial extension.

9. The drive assembly as recited in claim 7 wherein the damper includes a spring retainer holding a plurality of springs, the drive tab drivingly engaging the plurality of springs.

10. The drive assembly as recited in claim 7 wherein the damper includes a cover plate having a thrust surface for sliding along an inside surface of a cover of the torque converter.

11. A method of forming a drive assembly for a torque converter comprising:
providing a turbine shell including a rounded portion for supporting turbine blades and an outer radial extension extending radially with respect to a center axis of the torque converter outward from an outermost circumferential surface of the rounded portion; and
bonding a rear-side radially extending axially facing surface of a drive tab to a front-side radially extending axially facing surface of the outer radial extension of the turbine shell by adhesive.

12. The method as recited in claim 11 further comprising stamping the drive tab from an outer diameter of a cover plate of a damper.

13. The method as recited in claim 12 further comprising applying a hardening heat treatment the drive tab and the cover plate together before bonding the drive tab to the turbine shell.

14. The method as recited in claim 12 further comprising drivingly engaging the damper with the drive tab.

15. The method as recited in claim 12 further comprising providing a thrust surface on the cover plate for sliding along a cover of the torque converter.

16. The method as recited in claim 11 further comprising bonding a friction material to a side of the outer radial extension opposite the drive tab by adhesive.

17. The method as recited in claim 16 wherein the drive tab and the friction material are bonded to the outer radial extension by the same adhesive.

18. The method as recited in claim 11 further comprising engaging an impeller of the torque converter with the outer radial extension.

19. The method as recited in claim 11 further comprising fixing a damper to an inner radial extension of the turbine shell.

20. A drive assembly for a torque converter comprising:
- a turbine shell including a rounded portion and an outer radial extension on an outer circumference of the rounded portion;
- a drive tab bonded to the outer radial extension of the turbine shell by adhesive;
- an impeller, the outer radial extension of the turbine shell configured to engage and disengage the impeller; and
- a friction surface on a side of the outer radial extension opposite the drive tab, the outer radial extension engaging and disengaging the impeller via the friction surface.

\* \* \* \* \*